(12) United States Patent
Daga

(10) Patent No.: US 10,031,947 B2
(45) Date of Patent: Jul. 24, 2018

(54) METHOD AND APPARATUS FOR PERFORMING A SEARCH OPERATION ON HETEROGENEOUS COMPUTING SYSTEMS

(71) Applicant: Advanced Micro Devices, Inc., Sunnyvale, CA (US)

(72) Inventor: Mayank Daga, Austin, TX (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 354 days.

(21) Appl. No.: 14/749,063

(22) Filed: Jun. 24, 2015

(65) Prior Publication Data

US 2016/0378791 A1    Dec. 29, 2016

(51) Int. Cl.
*G06F 17/30*    (2006.01)

(52) U.S. Cl.
CPC .............. *G06F 17/30519* (2013.01)

(58) Field of Classification Search
CPC .................................. G06F 17/30519
USPC .......................................... 707/769
See application file for complete search history.

(56) References Cited

U.S. PATENT DOCUMENTS

| | | | | |
|---|---|---|---|---|
| 7,774,734 B2* | 8/2010 | Goldberg | ........... | G01C 21/3446 701/533 |
| 8,134,561 B2* | 3/2012 | Harper | ..................... | G06T 1/20 345/501 |
| 8,364,717 B2* | 1/2013 | Delling | ............. | G06F 17/30533 707/798 |
| 9,547,728 B2* | 1/2017 | Bornhoevd | ....... | G06F 17/30958 |
| 9,582,848 B2* | 2/2017 | de Richebourg | ......... | G06T 1/60 |
| 9,672,557 B2* | 6/2017 | Zhou | .................. | G06Q 30/0631 |
| 2015/0356759 A1* | 12/2015 | Delling | ................. | G06T 11/206 345/440 |
| 2016/0055611 A1* | 2/2016 | Manevitch | ................ | G06T 1/20 345/501 |
| 2016/0335322 A1* | 11/2016 | Then | ................. | G06F 17/30958 |
| 2016/0377442 A1* | 12/2016 | Ye | ...................... | G01C 21/3446 701/533 |

OTHER PUBLICATIONS

Daga, Mayank, et al., "Efficient Breadth-First on a Heterogeneous Processor", BigData 2014, Washington, DC, Oct. 27-30, 2014, pp. 373-382.*

Munguía, Lluís-Miquel, et al., "Task-based Parallel Breadth-First Search in Heterogeneous Environments", HiPC 2012, Pune, India, Dec. 18-22, 2012, pp. 1-10.*

Ueno, Koji, et al., "Parallel Distributed Breadth First Search on GPU", HiPC 2013, Bangalore, India, Dec. 18-21, 2013, pp. 314-323.*

(Continued)

*Primary Examiner* — Robert Stevens
(74) *Attorney, Agent, or Firm* — Volpe and Koenig, P.C.

(57) ABSTRACT

A method and apparatus for performing a top-down Breadth-First Search (BFS) includes performing a first determination whether to convert to a bottom-up BFS. A second determination is performed whether to convert to the bottom-up BFS, based upon the first determination being positive. The bottom-up BFS is performed, based upon the first determination and the second determination being positive. A third determination is made whether to convert from the bottom-up BFS to the top-down BFS, based upon the third determination being positive.

12 Claims, 6 Drawing Sheets

(56) References Cited

OTHER PUBLICATIONS

Beamer, Scott, et al., "Distributed Memory Breadth-First Search Revisited: Enabling Bottom-Up Search", IPDPSW 2013, Cambridge, MA, May 20-24, 2013, pp. 1618-1627.*

Beamer, Scott, et al., "Direction-Optimizing Breadth-First Search", SC12, Salt Lake City, UT, Nov. 10-16, 2012, pp. 1-10.*

Beamer, Scott, et al., "Searching for a Parent Instead of Fighting Over Children: A Fast Breadth-First Search Implementation for Graph500", Technical Report No. UCB/EECS-2011-117, Electrical Engineering and Computer Sciences Dept., University of California at Berkley, Berkeley, CA, Nov. 15, 2011, 11 pages.*

Berry, Jonathan W., et al., "Software and Algorithms for Graph Queries on Multithreaded Architectures", IPDPS 2007, Rome, Italy, Mar. 26-30, 2007, 14 pages.*

Hong, Sungpack, et al., "Efficient Parallel Graph Exploration on Multi-Core CPU and GPU", PACT 2011, Galveston, TX, Oct. 10-14, 2011, pp. 78-88.*

Shang, Haichuan, et al., "Efficient Breadth-First Search on Large Graphs with Skewed Degree Distributions", EDBT/ICDT '13, Genoa, Italy, Mar. 18-22, 2013, pp. 311-322.*

Merrill, Duane et al., "Scalable GPU Graph Traversal", PPoPP'12, Feb. 25-29, 2012, 11 pgs., New Orleans, Louisiana, USA.

Beamer, Scott et al., "Direction-Optimizing Breadth-First Search", SC12, Nov. 10-16, 2012, 10 pgs., Salt Lake City, Utah, USA.

\* cited by examiner

METHOD AND APPARATUS FOR PERFORMING A SEARCH OPERATION ON HETEROGENEOUS COMPUTING SYSTEMS

FIELD OF THE INVENTION

The present invention is generally directed to performing a search operation, and more particularly to performing a search operation on heterogeneous parallel processors.

BACKGROUND

Graph applications have become ubiquitous in the present age. Social networking programs, online purchasing programs, and map programs, for example, utilize graph applications to provide searching ability, recommendation analytics, and the like. One type of searching algorithm for a graph application is Breadth-First Search (BFS).

BFS is a fundamental primitive used in several graph applications and hence, accelerating it may be useful. The conventional algorithm for BFS traversal manifests only one degree of freedom, which is a traversal algorithm that can be either top-down or bottom-up. These search algorithms may be performed on a processor, such as a central processing unit (CPU), or a graphics processing unit (GPU), and each of these algorithms have advantages and disadvantages depending on the type of graph applications being searched.

For example, the bottom-up algorithm works well for graphs with a large average degree, where the degree of a vertex in the graph may be defined as the number of incident edges to that vertex. The bottom-up algorithm may be efficient for the intermediate iterations during the life-cycle of BFS when the number of visited vertices is substantially large. The reverse is true for the top-down algorithm. Hence, the optimal algorithm and platform for a BFS traversal may depend on the characteristics of the input graph.

GPUs have gained popularity as an accelerator platform in recent years, but GPUs have not been conventionally utilized to perform BFS because the traditional top-down BFS algorithm oftentimes includes a lack of locality, irregular memory access patterns and load imbalance. Recently, however, a bottom-up BFS algorithm has been developed which mitigates the challenges of the top-down algorithm on GPUs. The bottom-up algorithm proceeds by finding the parents of unvisited vertices as compared to the top-down algorithm which finds the children of visited vertices in a graph. Current techniques have implemented the BFS algorithm, with top-down and bottom-up characteristics, on homogeneous processors like CPUs and GPUs. Such methods, however do not utilize the heterogeneous capabilities that are becoming increasingly important to maximize performance under restrictive thermal budgets.

Accelerated processing units (APUs), however, include both a CPU and GPU and accordingly, either processing unit may be utilized to perform the BFS algorithm. It would therefore be beneficial to provide a method and apparatus for performing a BFS that can partition the execution between the top-down and bottom-up algorithms as well as select the appropriate processing unit for every iteration of BFS.

SUMMARY OF EMBODIMENTS

An embodiment directed to a method of performing a top-down Breadth-First Search (BFS) is disclosed. The method includes performing a first determination whether to convert to a bottom-up BFS. A second determination is performed whether to convert to the bottom-up BFS, based upon the first determination being positive. The bottom-up BFS is performed, based upon the first determination and the second determination being positive. A third determination is made whether to convert from the bottom-up BFS to the top-down BFS, based upon the third determination being positive.

An embodiment directed to a processor is disclosed. The processor includes circuitry configured to perform a top-down Breadth-First Search (BFS), circuitry configured to perform a first determination whether to convert to a bottom-up BFS, circuitry configured to perform a second determination whether to convert to the bottom-up BFS, based upon the first determination being positive, circuitry configured to perform the bottom-up BFS, based upon the first determination and the second determination being positive, and circuitry configured to perform a third determination whether to convert from the bottom-up BFS to the top-down BFS, based upon the third determination being positive.

An embodiment directed to non-transitory computer-readable medium is disclosed. The non-transitory computer-readable medium having instructions recorded thereon that, when executed by a computing device, cause the computing device to perform operations comprising performing a top-down Breadth-First Search (BFS); performing a first determination whether to convert to a bottom-up BFS; performing a second determination whether to convert to the bottom-up BFS, based upon the first determination being positive; performing the bottom-up BFS, based upon the first determination and the second determination being positive; and performing a third determination whether to convert from the bottom-up BFS to the top-down BFS, based upon the third determination being positive.

BRIEF DESCRIPTION OF THE DRAWINGS

A more detailed understanding may be had from the following description, given by way of example in conjunction with the accompanying drawings wherein.

DETAILED DESCRIPTION OF THE EMBODIMENTS

Although a more detailed description of the embodiments is provided below, briefly a hybrid Breadth-First Search (BFS) algorithm is disclosed which uses an online heuristic to choose between a top-down and bottom-up search algorithm and the appropriate execution platform for each iteration of the BFS. The heuristic takes into account the characteristics of the graph as well as traversal information from prior iterations of the BFS to make decisions. The hybrid BFS algorithm may be implemented on Accelerated Processing Units (APUs) or any other processor that may employ heterogeneous or dissimilar computational units, as the need for data-copies as well as the bus, (e.g., PCIe), overhead is eliminated.

Figure 1:
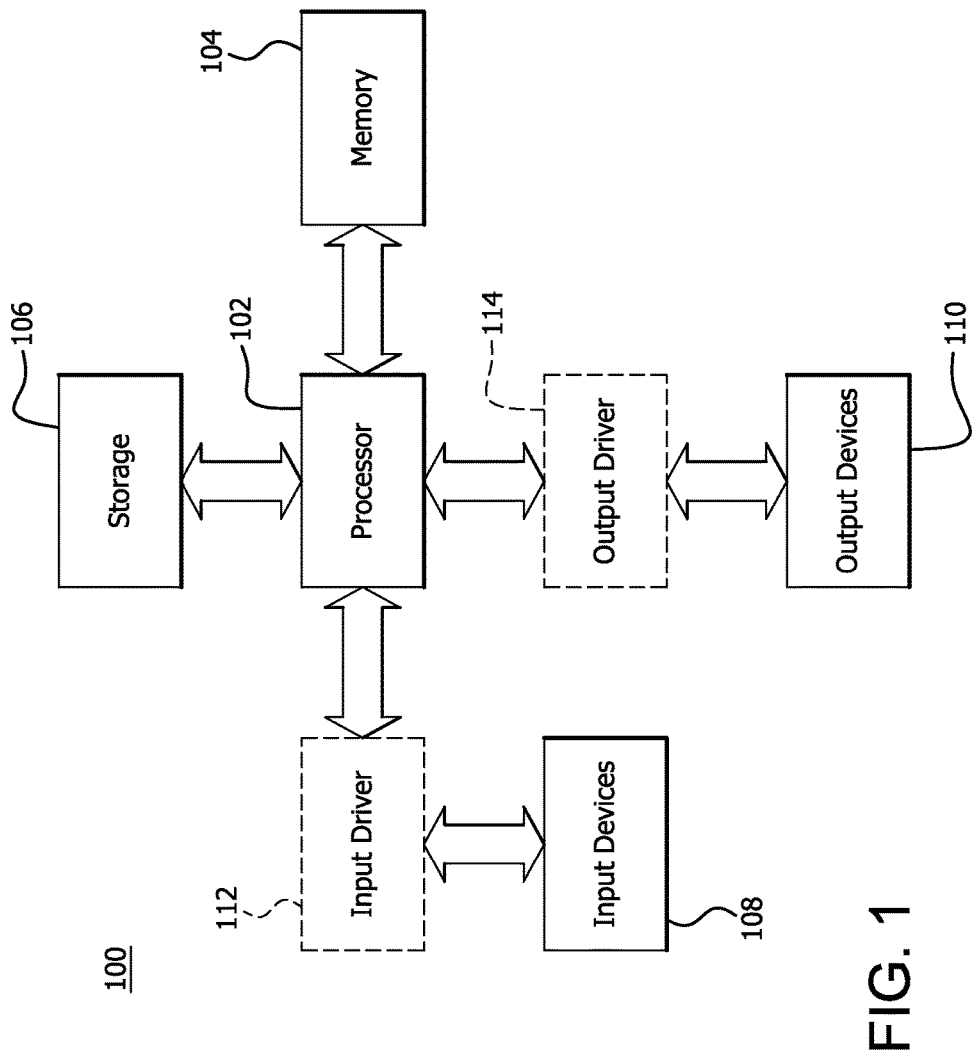
FIG. 1 is a block diagram of an example device in which one or more disclosed embodiments may be implemented.

FIG. 1 is a block diagram of an example device 100 in which one or more disclosed embodiments may be implemented. The device 100 may include a computer, for example, a desktop computer, a tablet computer, a gaming device, a handheld device, a set-top box, a television, or a mobile phone. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU), a graphics processing unit (GPU), a CPU and GPU located on the same die, or one or more processor cores, wherein each processor core may be a CPU or a GPU. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. Although described embodiments include a main display, the invention may be practiced without a main display, and only include a source device of video. In this way, the control territory may be an office environment with a plurality of portable devices and no main display.

Figure 2:
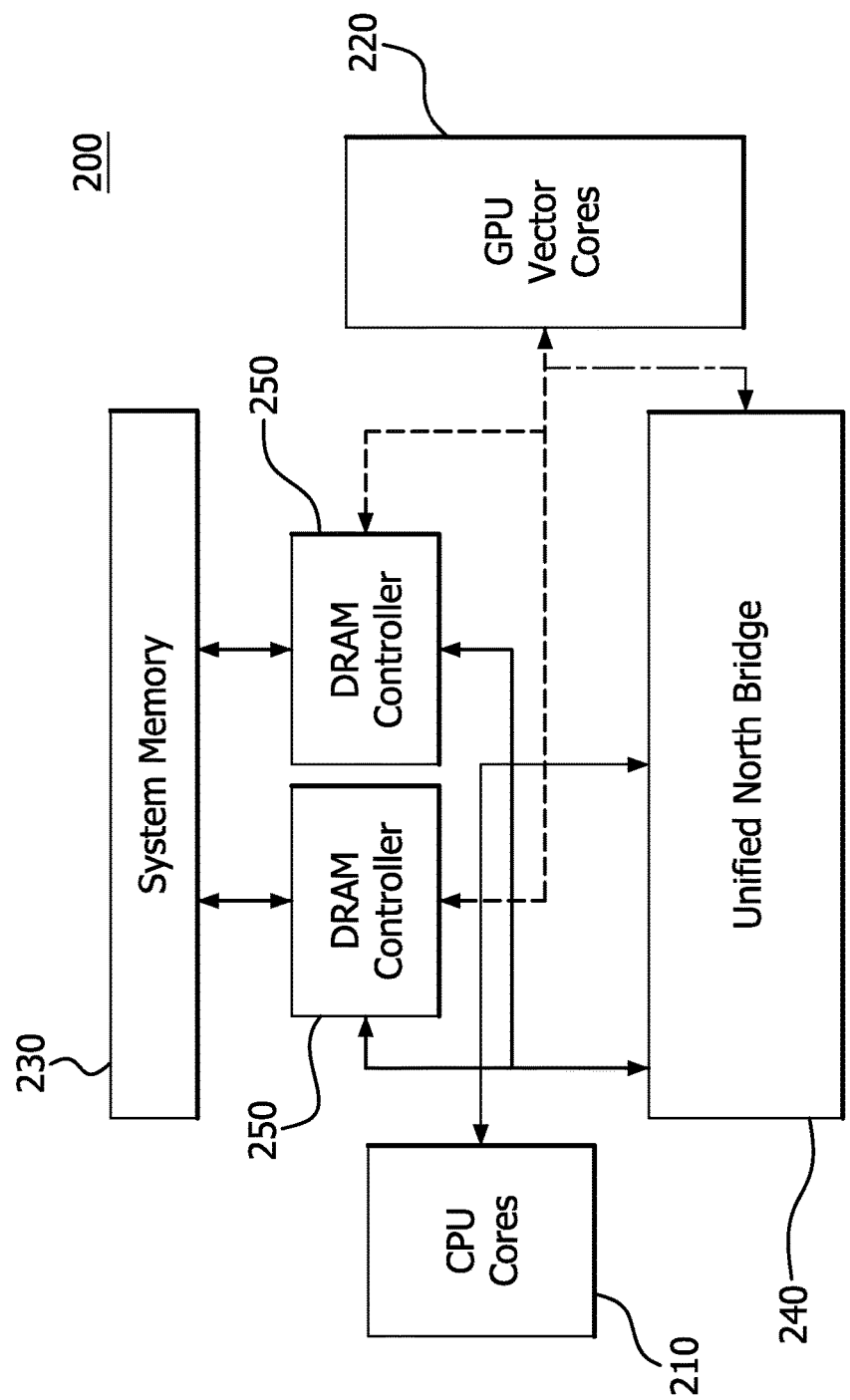
FIG. 2 is a block diagram of an example Accelerated Processing Unit (APU) according to an embodiment.

FIG. 2 is a block diagram of an example APU 200 according to an embodiment. The APU 200 may include Central Processing Unit (CPU) cores 210, Graphics Processing Unit (GPU) cores 220, System Memory 230, a Unified North Bridge 240, and one or more DRAM controllers 250. The CPU 210 may be used, for example, to perform the top-down BFS algorithm, a first determination whether to convert to a bottom-up BFS algorithm, and a second determination whether to convert to the bottom-up BFS algorithm. The GPU 220 may be used to perform the bottom-up BFS algorithm based upon the first determination and the second determination being positive on the CPU 210.

The system memory 230 may be located on the same die as CPU 210 and GPU 220 or may be located separately. The system memory 230 may include volatile and non-volatile memory, for example, random access memory (RAM), dynamic RAM, or a cache. The system memory 230 can be used to store an input graph and all other related data structures which are used to perform a BFS. The Unified North Bridge 240 may include circuitry to receive system memory/data requests from the CPU and GPU. The DRAM controllers 250 includes circuitry which acts as an interface between the Unified North Bridge 240 and system memory 230.

Figure 3:
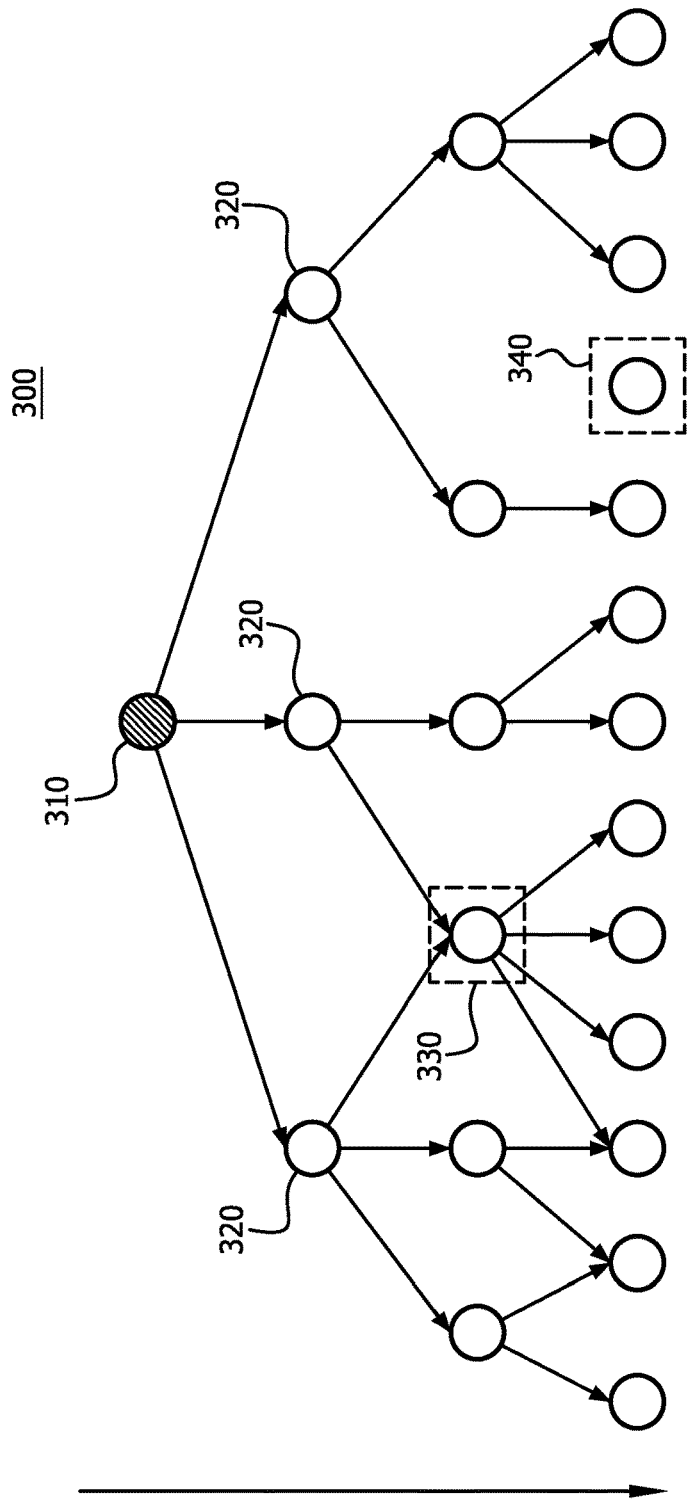
FIG. 3 is a schematic representation of an example top-down Breadth-First Search (BFS) according to an embodiment.

FIG. 3 is a schematic representation of an example top-down BFS 300 according to an embodiment. The BFS 300 includes a plurality of vertices (designated 310, 320, 330 and 340). In BFS 300, vertex 310 is depicted as a visited vertex, and vertices 320, 330 and 340 are depicted as unvisited vertices. Accordingly, the BFS 300 searches for unvisited vertices 320 that are children of a visited vertex. Therefore, vertices 320 that are children to vertex 310 are searched. In the top-down algorithm, children of vertices which were visited in a previous step of the BFS are found.

The algorithm starts at the source node and proceeds by examining all of its neighbors. If a neighbor has not been visited yet, it is added to the 'frontier' and marked as visited in the 'visited' bitmap. At every step, nodes from frontier are searched and their neighbors are examined. This process is repeated until a BFS-tree is generated. The runtime of the top-down algorithm may be proportional to the number of neighbors examined by each node in the frontier. The frontier may be implemented using a queue datastructure or a bitmap for all the vertices in the graph. In the bitmap, a bit set to 0 may be used to indicate that the respective vertex is not present in the frontier and vice versa.

Additionally, the amount of parallelism for the top-down algorithm depends on the number of nodes in the frontier. During intermediate search steps, when frontier is large and has abundant parallelism, the neighbor check may result in excess computation as a neighbor of one node might have already been claimed by another node. Therefore, top-down is an inherently sequential algorithm and may be more effective when the frontier is small.

The vertex 330 may be searched from multiple vertices. To ensure correctness of BFS, the top-down algorithm may search vertex 330 from that vertex which lies first when all the vertices from which 330 can be searched are listed in ascending order. The vertex 340 is a vertex with no incident edge or with degree=0. Such vertices may not be included in the final BFS tree.

Figure 4:
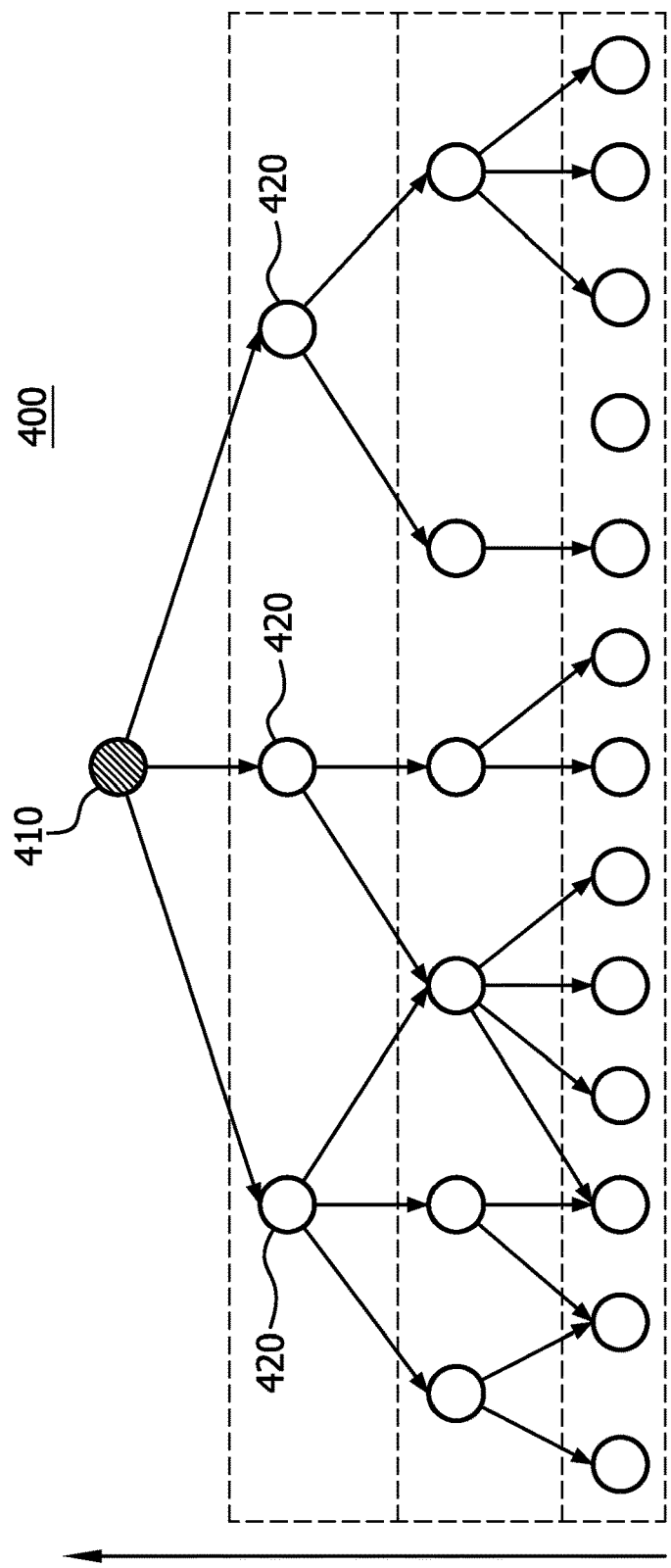
FIG. 4 is a schematic representation of an example bottom-up BFS according to an embodiment.

FIG. 4 is a schematic representation of an example bottom-up BFS 400 according to an embodiment. The BFS 400 includes a plurality of vertices (designated 410 and 420). In BFS 400, node 410 is depicted as a visited vertex and nodes 420 are designated as unvisited vertices. Accordingly, the BFS 400 searches for visited vertices 410 that are the parent of an unvisited vertex. Therefore, vertex 410 is searched from vertices 420 that are children to vertex 410. All the vertices 420 are now marked as visited and their parent is updated as vertex 410. In the next step, all the unvisited vertices, (i.e., vertices barring 410 and 420), attempt to search for vertices 410 or 420. If any vertex is able to find them, that vertex is marked as visited and their parent is updated. Since the bottom-up algorithm finds parents of unvisited vertices, initially, only the source vertex is marked as visited and is taken as a parent by that unvisited vertex of which it is a neighbor. The neighbors of all unvisited vertices are examined to find respective parents. All unvisited vertices who have found a parent are marked visited and are added to the frontier for the next step.

This process repeats until a BFS-tree is generated. A conventional bottom-up algorithm performs BFS using three different bitmaps—next, frontier, and visited. The next bitmap tracks all the vertices who found their parent in the current iteration. These vertices will become parents for unvisited vertices in the next iteration, which are tracked using the frontier bitmap. This is the reason for the swap between frontier bitmaps and next bitmaps after every iteration. The next bitmap from last iteration is the frontier bitmap for the current iteration. The visited bitmap tracks all the vertices that have been visited so far and hence, after every iteration there is a union of next and visited bitmaps. The runtime of the bottom-up algorithm may be proportional to the number of neighbors examined by every unvisited vertex.

The bottom-up algorithm is inherently parallel as neighbors of every unvisited vertex can be examined independently and hence, may be suited for parallel processors. The bottom-up may be desirable when the frontier is large because a large frontier means a large number of vertices can be claimed as parents by the unvisited vertices. Hence, the large frontier is stored as a bitmap for efficient compaction in memory. Since a GPU-thread can be mapped to an unvisited vertex, the bottom-up algorithm may be efficiently performed on a GPU.

The top-down and bottom-up algorithms for BFS traversal each have their own merits and disadvantages, and neither may be beneficial for using during the entire life cycle of the BFS. Accordingly, leveraging the virtues of the two and combining them to form a hybrid algorithm may provide for a more beneficial BFS algorithm than using only one or the other, since the top-down algorithm may be useful to perform significantly serial searches, whereas, the bottom-up algorithm may be useful where significant parallelism in the graph exists.

Figure 5:
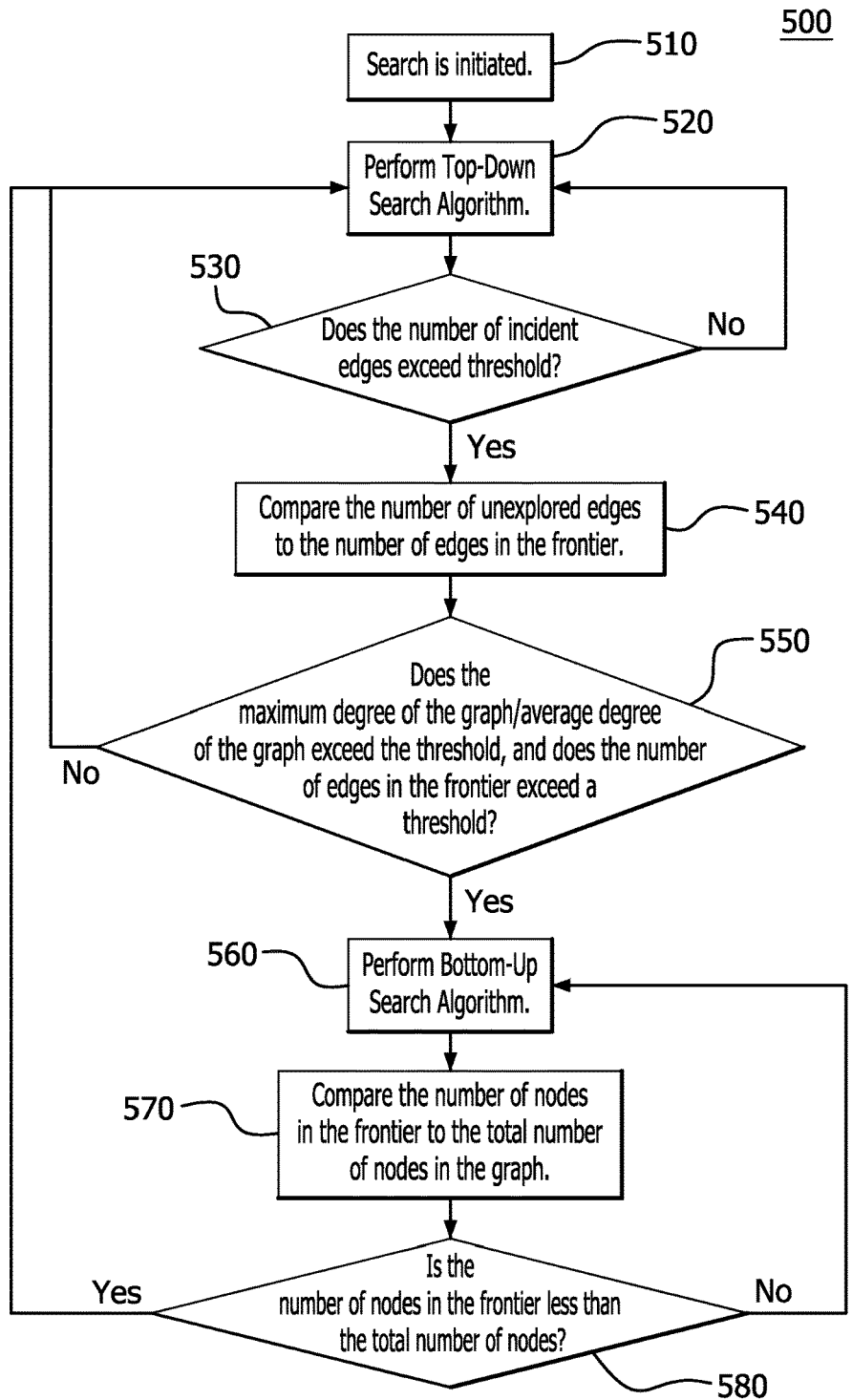
FIG. 5 is a flow diagram of an example method of performing a BFS according to an embodiment.

FIG. 5 is a flow diagram of an example method 500 of performing a BFS according to an embodiment. As will be described in more detail below, the method 500 generally encompasses performing a serial top-down algorithm, (e.g., on the CPU), at the beginning of the BFS, transitioning to the bottom-up algorithm, (e.g., on the GPU) for the intermediate steps, and reverting back to the top-down algorithm, (e.g., on the CPU), for the final steps. The hybrid algorithm may switch between the top-down and bottom-up algorithms using an online heuristic. The heuristic may make the decision of switching from the top-down algorithm to the bottom-up algorithm, and vice-versa, by using, for example, the following parameters—the number of edges in the frontier ($m_f$), the number of unexplored edges ($m_u$), the number of vertices in the frontier ($n_f$), and the total number of connected vertices in the graph ($n_e$).

Accordingly, in step 510, a search is initiated, and the top-down search algorithm is performed (step 520). In an example embodiment, the top-down algorithm may be performed on the CPU. Since in some searches, where the number of incident edges, (i.e., the number of edges that are connected to a vertex), is low, it may not be beneficial to switch from the top-down search algorithm, in step 530, a determination is made as to whether or not the number of incident edges exceeds a threshold. During the top-down search algorithm performance, a queue may be used to store the frontier because top-down may be performed only for those steps that lack parallelism. For such steps, the frontier consists of few vertices and it may be more space efficient to store only those nodes in a queue rather than have a bitmap for all vertices of the graph.

Step 530 may include determining the amount of parallelism in the graph by comparing the maximum degree of the graph ($deg_{max}$) to the average degree of the graph ($deg_{avg}$), in accordance with the following equation:

$$deg_{max}/deg_{avg} > \theta_{GPU},\quad \text{Equation (1)}$$

where $\theta_{GPU}$ is a tuning parameter that sets a threshold $T_{deg}$, (i.e., $\theta_{GPU} = T_{deg}$). For example, if $T_{deg}$ is set to 4, and the amount of parallelism in the graph does not exceed the threshold of 4, then the method reverts to step 520 and the top-down algorithm is performed for the entire BFS. However, if the amount of parallelism exceeds the threshold, (e.g., 4), then the method proceeds to step 540, where the number of unexplored edges is compared to the number of explored edges. Accordingly, scheduling decisions may be rendered more easily as it can be determined whether or not CPU nodes only are used, or a combination of CPU and GPU nodes.

In step 540, the number of unexplored edges may be compared to the number of edges in the frontier in accordance with the following equation:

$$m_f > m_u/\alpha_{GPU},\quad \text{Equation (2)}$$

where $\alpha_{GPU}$ is a tuning parameter to modify $m_u$ to set a threshold, (i.e., $m_u/\alpha_{GPU} = T_{edge}$). For example, $\alpha_{GPU}$ may be set to 24.

If the maximum degree of the graph over the average degree of the graph exceeds $T_{deg}$ and the number of edges in the frontier exceeds $T_{edge}$ (step 550), then the BFS is switched to performing a bottom-up search algorithm (step 560).

In step 560, to perform the bottom-up search algorithm, the data structures are transformed from a queue type data structure to a bitmap type data structure. That is, moving from the top-down algorithm being performed in step 520 to the bottom-up algorithm 560 may require transforming the queue data structure to a bitmap data structure. This transformation may be performed by looping over all the vertices in the queue and setting the corresponding bits in the bitmap to 1, for example, for all the vertices in the queue. The transformation from queue to bitmap may be performed in linear time with a time complexity of O(n) where 'n' is the number of vertices in the queue. This means that the time taken for the transformation from queue to bitmap increases linearly with an increase in 'n'.

The bitmap data structure utilized during step 560 is a two (2) bitmap data structure. That is, a frontier bitmap and visited bitmap alone are used to determine whether a vertex has been visited. For example, whether a vertex has been visited or not, and whether a neighbor of a vertex has been visited or not, may be performed using only one bitmap, (e.g., the visited bitmap). The second bitmap, (e.g., frontier), may be used to track the vertices which searched their parent in the current iteration of the BFS.

Once the size of the frontier decreases, it may be desirable to switch back to the top-down algorithm. This may occur, for example, during the final stages of the BFS as most of the nodes in the connected component may have been already visited and the non-connected nodes may only generate false positives. Accordingly, in step 570, the number of nodes in the frontier are compared to the total number of nodes in the graph. This comparison may be performed in accordance with the following equation:

$$n_f < n_c/\beta_{CPU},\quad \text{Equation (3)}$$

where $\beta_{CPU}$ is a tuning parameter to modify $n_c$ to set a threshold, (i.e., $n_c/\beta_{CPU} = T_{node}$). For example, $\beta_{CPU}$ may be set to 85. If the number of nodes in the frontier is less than $T_{node}$, (step 580), then the method reverts to the top-down algorithm (step 520). Otherwise, the method continues to perform the bottom-up algorithm (step 560).

Figure 6A:
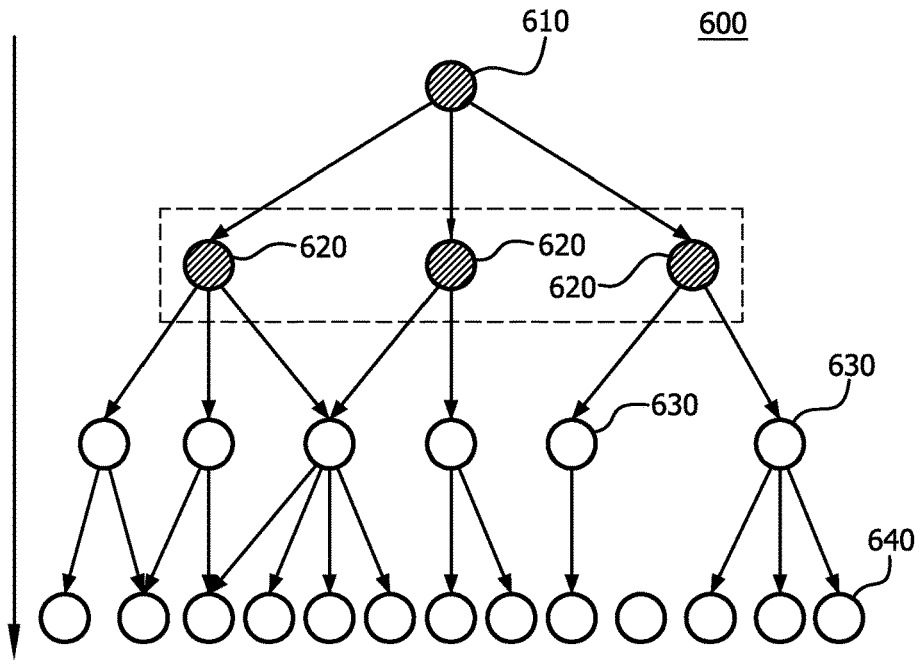
FIGS. 6A-6B are schematic representations of an example BFS according to an embodiment.
Figure 6B:
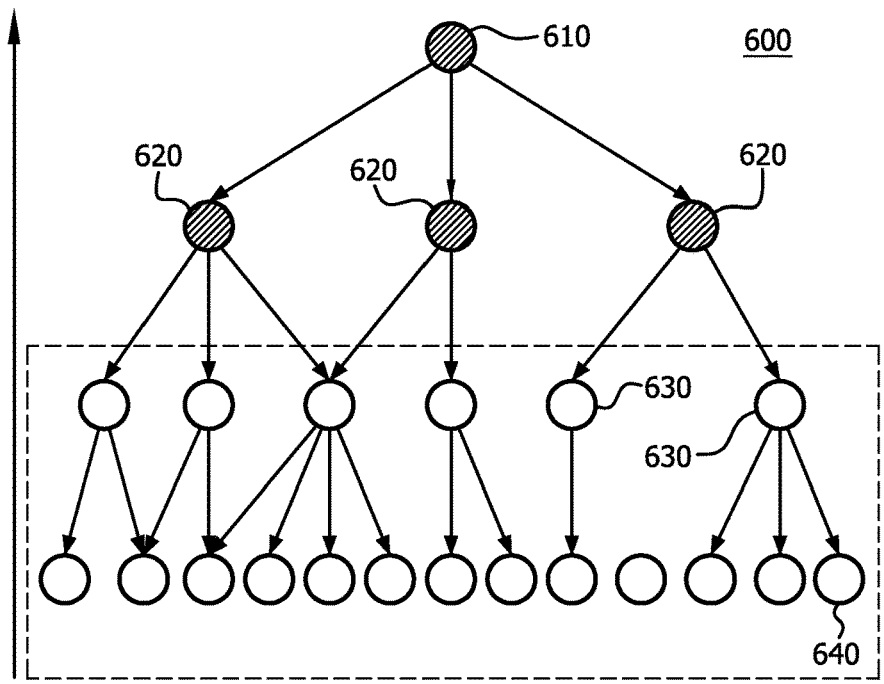

FIGS. 6A and 6B are schematic representations of an example BFS 600 according to an embodiment. For example, the BFS 600 may be performed in accordance with the method 500 described above. The BFS 600 includes an initial vertex 610, and a plurality of vertices 620 and 630.

As shown in FIG. 6A, the top-down algorithm, (e.g., step 520 of method 500), is performed beginning with vertex 610 and through vertices 620. Once the conditions for switching to the bottom-up algorithm are met, (e.g., step 550 of method 500), then the algorithm switches to the bottom-up algorithm, (e.g., step 560 of method 500 as depicted in FIG. 6B.

Once the top-down algorithm is complete, vertices 610 and 620 are marked as visited whereas all other vertices denoted by the bounding box, (i.e., hashed-line rectangle), are marked unvisited. In the bottom-up algorithm 560, all the unvisited vertices search for their parent among the visited vertices. Vertices 630 will find their parents 620 and will also be now marked visited. Now, step 570 will be performed to compare number of vertices in the frontier and the total number of vertices. Once the condition for switching back to the top-down algorithm becomes true (step 580), all the remaining vertices 640 will be searched using the top-down algorithm 520.

It should be understood that many variations are possible based on the disclosure herein. Although features and elements are described above in particular combinations, each feature or element may be used alone without the other features and elements or in various combinations with or without other features and elements.

For example, although specific numbers were provided for example parameter values, it should be understood that the tuning parameters are not limited to those example values. Additionally, although the various algorithms are depicted as being performed on either one type of processor or another, (e.g., CPU or GPU), either algorithm may be performed on either type of processor. Furthermore, although an APU is described above that may include a CPU and GPU, the method above could be performed by discrete processors, such as a discrete CPU and/or GPU.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the present invention.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing a search by a first or second processor, the method comprising:
   performing, by the first processor, a top-down Breadth-First Search (BFS);
   performing, by the first processor, a first determination whether to convert the search to a bottom-up BFS wherein a number of incident edges of a graph are compared to a threshold;
   performing, by the first processor, a second determination whether to convert the search to the bottom-up BFS, based upon the number of incident edges of the graph exceeding the threshold, wherein the second determination includes comparing a number of unexplored edges to a number of edges in a frontier of the graph;
   performing, by the second processor the bottom-up BFS, based upon the number of incident edges of the graph exceeding the threshold and the number of edges in the frontier exceeds the unexplored edges along with a parameter; and
   performing, by the first processor, a third determination whether to convert from the bottom-up BFS to the top-down BFS, based upon comparing a number of vertices in a frontier of a graph to a total number of vertices in the graph, whereby if the number of vertices in the frontier of the graph is less than the total number of vertices in the graph along with a parameter, the first processor determines to convert from the bottom-up BFS to the top down BFS.

2. The method of claim 1 wherein if a maximum degree of the graph compared to an average degree of the graph exceeds the threshold, the first processor performs the second determination.

3. The method of claim 1, further comprising converting, by the first processor, a data structure from a first data structure to a second data structure upon converting from the top-down BFS to the bottom-up BFS.

4. The method of claim 3 wherein the first data structure is a queue data structure and the second data structure is a bitmap data structure.

5. The method of claim 4 wherein the bitmap data structure is a two bitmap data structure.

6. The method of claim 5 wherein a visited bitmap is used to determine whether a vertex has been visited and a frontier bitmap is used to track vertices that searched their parents during an iteration of the bottom-up BFS.

7. An apparatus, comprising:
   a first processor that:
      performs a top-down Breadth-First Search (BFS);
      performs a first determination whether to convert the search to a bottom-up BFS wherein a number of incident edges of a graph are compared to a threshold;
      performs a second determination whether to convert the search to the bottom-up BFS, based upon the number of incident edges of the graph exceeding the threshold, wherein the second determination includes comparing a number of unexplored edges to a number of edges in a frontier of the graph; and
   a second processor that performs the bottom-up BFS, based upon the number of incident edges of the graph exceeding the threshold and the number of edges in the frontier exceeds the unexplored edges along with a parameter; and
   wherein the first processor performs a third determination whether to convert from the bottom-up BFS to the top-down BFS, based upon comparing a number of vertices in a frontier of a graph to a total number of vertices in the graph, whereby if the number of vertices in the frontier of the graph is less than the total number of vertices in the graph along with a parameter, the first processor determines to convert from the bottom-up BFS to the top down BFS.

8. The apparatus of claim 7, wherein the first processor converts a data structure from a first data structure to a second data structure upon converting from the top-down BFS to the bottom-up BFS.

9. The apparatus of claim 8 wherein the first data structure is a queue data structure and the second data structure is a bitmap data structure.

10. The apparatus of claim 9 wherein the bitmap data structure is a two bitmap data structure.

11. The apparatus of claim wherein the first processor that performs the top-down BFS is included in a central processing unit (CPU) and the second processor that performs the bottom-up BFS is included in a graphics processing unit (GPU).

12. A non-transitory computer-readable medium having instructions recorded thereon that, when executed by a computing device, cause the computing device to perform operations comprising:

performing, by a first processor, a top-down Breadth-First Search (BFS);

performing, by the first processor, a first determination whether to convert the search to a bottom-up BFS wherein a number of incident edges of a graph are compared to a threshold;

performing, by the first processor, a second determination whether to convert the search to the bottom-up BFS, based upon the number of incident edges of the graph exceeding the threshold, wherein the second determination includes comparing a number of unexplored edges to a number of edges in a frontier of the graph;

performing, by a second processor the bottom-up BFS, based upon the number of incident edges of the graph exceeding the threshold and the number of edges in the frontier exceeds the unexplored edges along with a parameter; and performing, by the first processor, a third determination whether to convert from the bottom-up BFS to the top-down BFS, based upon comparing a number of vertices in a frontier of a graph to a total number of vertices in the graph, whereby if the number of vertices in the frontier of the graph is less than the total number of vertices in the graph along with a parameter, the first processor determines to convert from the bottom-up BFS to the top down BFS.

* * * * *